United States Patent [19]

Farmont

[11] Patent Number: 4,626,027
[45] Date of Patent: Dec. 2, 1986

[54] SLIDING ROOF FOR A VEHICLE

[75] Inventor: Rolf Farmont, Dusseldorf, Fed. Rep. of Germany

[73] Assignee: Farmont Produktion GmbH & Co. Kg, Dusseldorf, Fed. Rep. of Germany

[21] Appl. No.: 698,778

[22] Filed: Feb. 6, 1985

[30] Foreign Application Priority Data

Feb. 9, 1984 [DE] Fed. Rep. of Germany ....... 3404541

[51] Int. Cl.⁴ ........................... B60J 7/057; B60J 7/04
[52] U.S. Cl. .................................... 296/223; 296/216; 49/138
[58] Field of Search ..................... 296/216, 220–223; 49/138

[56] References Cited

U.S. PATENT DOCUMENTS 4,474,405  10/1984  Kloppe et al. ..................... 296/220

FOREIGN PATENT DOCUMENTS 2813651  10/1979  Fed. Rep. of Germany ...... 296/221
3202646   1/1982  Fed. Rep. of Germany .
   18301   3/1914  France ............................. 296/223
 1090528   3/1955  France ............................. 296/221
59-12717   1/1984  Japan .
  884344  12/1961  United Kingdom ............... 296/222
 1156755   7/1969  United Kingdom ............... 296/216
 2068304   8/1981  United Kingdom ............... 296/216

Primary Examiner—Robert B. Reeves
Assistant Examiner—Dennis H. Pedder
Attorney, Agent, or Firm—Yount & Tarolli

[57] ABSTRACT

A sliding roof for a vehicle comprises a plate movable lengthwise of the vehicle for opening and closing an opening in the vehicle roof. A front support supports the front end of the plate and is movable lengthwise of the vehicle for moving the plate between different positions. A rear support supports the rear end of the plate. A height-adjusting device is associated with the rear support to adjust the height of the rear end of the plate as the plate moves lengthwise of the vehicle. The rear support is also moved lengthwise of the vehicle to effect adjustment of the height of the rear end of the plate. An actuator effects movement of the front and rear supports at different speeds in a predetermined relative relationship in order to effect height adjustment.

8 Claims, 9 Drawing Figures

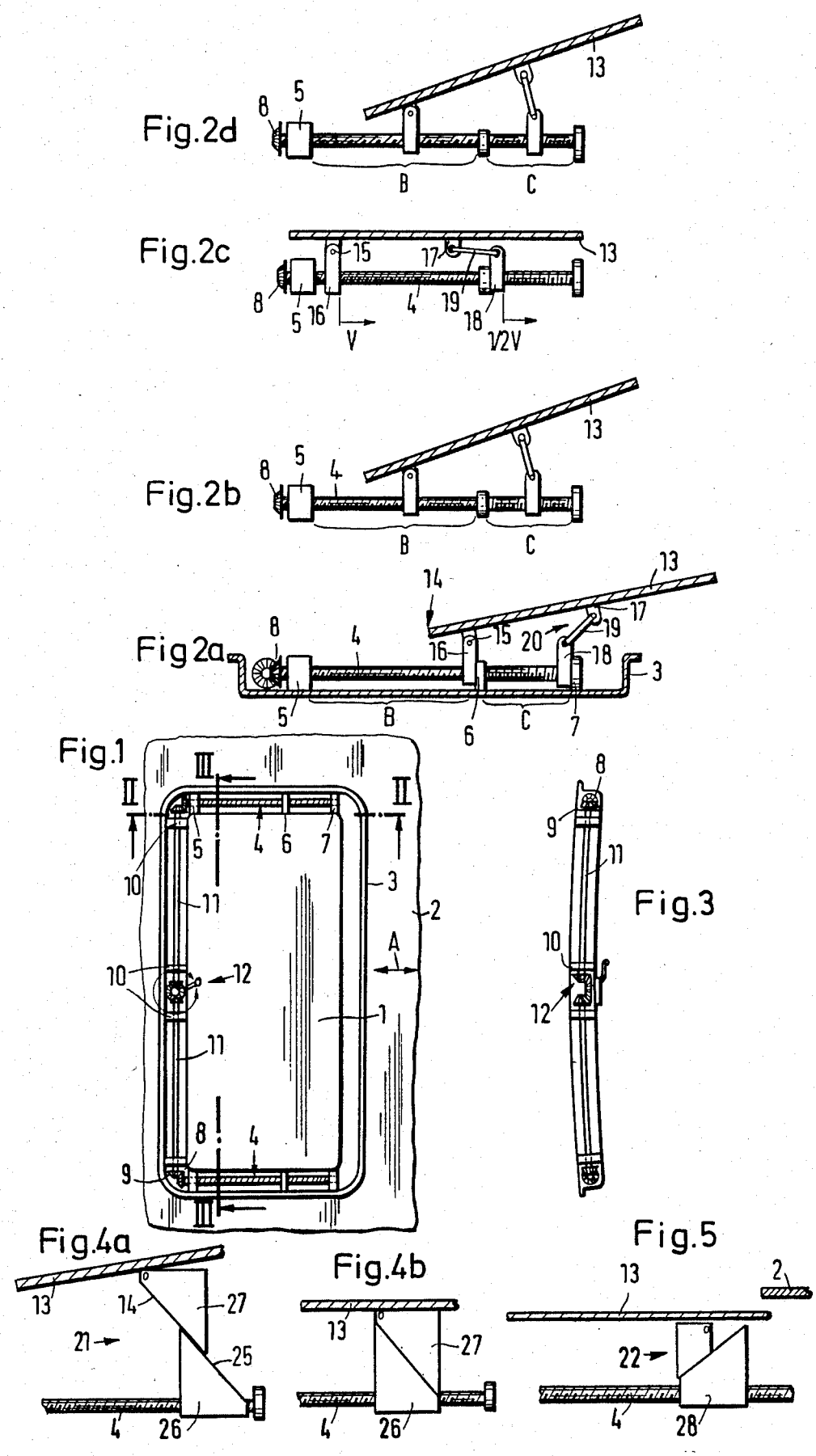

SLIDING ROOF FOR A VEHICLE

The invention relates to a sliding roof for a vehicle that includes a plate closing in its foremost position, an opening in the vehicle roof. The plate is height adjusted at the rear end thereof. An actuator provides for adjusting of the plate height at the rear end of the plate. The plate is supported at the front end thereof by a front support to which it is connected by an axle fixed to the plate. The front support is adapted to move back and forth lengthwise of the vehicle whereby the plate is also moved in the direction of movement of the front support. The actutor that provides for height adjustment also provides for lengthwise movement of the front support. The plate is supported at its rear end by at least one rear support on which a height adjusting device is mounted. The height adjusting device includes a support member connected to the plate at the rear end thereof. Upon movement of the front support lengthwise, the relative lengthwise position of the front and rear supports changes.

Such a sliding roof is known from German Disclosure No. 31 24 325. There, the rear support is mounted stationary. To change the relative positon of the rear support and the support member lengthwise of the vehicle to provide height adjustment in the zone of the rear end of the plate, a slide rail with a longitudinal slot is provided at the side of the plate. The rail must be mounted permanently on the plate and is clearly visible. Movement of the support member in the guiding slot causes knocking noises when driving with the roof in a raised position. Finally, with this known sliding roof, it is only possible to open the roof opening only to a limited extent since the plate must be supported at two consecutive points during its movement to different opening positions.

The object of the invention is providing a sliding roof for a vehicle of the kind mentioned above in which the actuating mechanism has as few and as simple parts as possible, and in which the knocking noises are substantially reduced while the widest possible lengthwise movement of the plate is assured. Such a vehicle sliding roof should also, especially in open positions, have an especially pleasant total view which is achieved by eliminating unattractive parts. Also, the plate must be easy mountable on the vehicle roof and, especially, easy replaceable and adjustable in height.

To achieve the foregoing it is proposed:

(a) to make the rear support also movable back and forth lengthwise of the vehicle;

(b) to cause the actuator to operate the rear support so that the latter, in the position of the plate in which a height adjustment takes place, moves relative to the front support, lengthwise of the vehicle, and (c) to keep the distance between the horizontal transverse axle and the support member constant.

The vehicle sliding roof made according to the invention has the following advantages:

The plate can be pushed relatively far back above the roof of the vehicle while extending at a very small angle to the vehicle roof favorable to air flow.

It is also possible to make the height adjustment in the opposite direction and, thus, lower the rear edge of the plate and push the whole plate completely under the vehicle roof.

Slots that generate knocking noices are eliminated.

A special rail fixed to the plate is unnecessary since the two hinge points are at a permanent distance on the plate, so that, especially with the use of transparent plate made of glass, acrylic or polycarbonate an especially aesthetic appearance is obtained.

Finally, it is possible to pre-assemble the vehicle sliding roof before installation, and also replace it as a compact unit with the use of an additional frame on a vehicle.

In one preferred form of execution of the invention:

(a) the actuator is a spindle extending in the lengthwise direction of the vehicle;

(b) the front and rear supports each include a threaded socket for receiving the spindle, and (c) the spindle pitches are different in the zones of the front and rear supports, respectively.

An especially simple spindle has, accordingly, two consecutive zones with similar threads but having different pitch, the pitch for the front support being greater or smaller than that for the rear support, so that with rotation of the spindle, front and rear supports move back and forth but with the distance therebetween changing steadily lengthwise of the vehicle. As a result, the relative position of the front support and the rear support changes lengthwise of the vehicle, whereby, in a manner known per se, a height adjustment of the plate in the zone of its rear end takes place. Such spindles have many advantages, for example, it is possible to support the spindle at both ends and also between the zones of movement of the front and rear supports, so that the structure of the supports is not only noise proof (insensitive to knocking) but also is very light and, in particular, may be made of a plastic material.

According to a further development, it is also possible to have the pitch of threading vary steadily along the spindle, (that is, increase, decrease or both alternately, in which case, the corresponding threaded sockets do not require continuous threading, usually needed otherwise, but only a spike at the inner surface of the socket meshing with the threading by which the socket, with rotation of the spindle, is moved faster or slower, according to the varying spindle pitch. This has the advantage that a complete movement of the plate can be realized, that is, in particular, the plate, in certain positions, can be kept especially steep, and in other positions can be kept especially flat.

It is also possible, in principle, according to another feature of the invention to mount the height-adjusting device between the transverse axes and the front support. This other height-adjusting device may be designed in the same way as that located between the support member and the rear support. Here, the relative change in position of the front and rear supports lengthwise of the vehicle, with lengthwise movement of the plate, has the effect that the latter can also be raised and lowered, in various moving positions and also in the zone of the front end, according to the particular requirements, while this adjustment in height is effected differently, as a rule, than the adjustment in height at the rear support. In this way it can be attained, in particular, at the beginning of the opening movement of the plate, raising or lowering of the plate end by a certain amount in all necessary zones, so that the plate is free for further movement, in the plane of the vehicle roof.

According to one aspect of the invention, the height adjusting device may include a lever arm, known per se, which at one end is pivotally connected to the respective hinge point of the plate, and at the other end, to the respective movable support. Instead of this, however, according to another aspect of the invention, the height-adjusting device may comprise corresponding oblique sliding surfaces which are provided, on one hand, at the hinge point of the plate and, on the other side, on the respective support, so that with relative movements of the two sliding surfaces in the direction of vehicle movement a height adjustment is effected. It may also be advantageous to mount the height-adjusting device on the front and/or rear support as a combined height-adjusting device, that is as a device which comprises both the oblique sliding surfaces and also a lever arm, a curve disc or the like. In this way even with uniform spindle pitch over the whole length of movement of the front and rear supports, complex height-adjustment movements with progressive opening or closing of the plate can be obtained.

In all cases, it is important that both the front and the rear supports are moved along lengthwise of the vehicle, so that relative positions of front and rear supports vary during the movement and, that, in this way, the height-adjusting means is actuated at the front and/or rear end based on the unchanging linkage point to the plate by a single actuator simultaneously with the opening and closing of the opening by the plate.

For insuring movement of the plate into opening and closing positions in which it opens or closes the roof opening, according to another feature of the invention, a locking element may be advantageously employed which cooperates, especially with the rear end of the plate and is preferably actuated commonly with the actuator of the vehicle slide roof. To this end, a flexible drive may be used which is actuated at the beginning of an opening or the end of a closing movement by a drive crank of the actuator. Namely, it is possible with such a drive crank to provide an idling run, so that, at first, with rotation of the crank, the flexible drive is actuated, and only after a predetermined angular movement of the crank, the drive acts on a drive shaft of the actuator.

The driving of the actuator can be made very simple and with few very operative parts, when, according to a further feature of the invention, the spindle is equipped at one end thereof with a bevel gear meshing with a bevel gear on the drive shaft. Preferably, one spindle is arranged on each side of the roof opening and both spindles are driven through bevel gear wheels. For ergonomic reasons, the drive shaft with a hand crank drive is mounted preferably at the front edge of the roof opening. The crank drive is preferably arranged in the middle of the front edge of the roof opening and actuates two drive shafts which form with each other an angle defined by the arching of the roof.

The preferred embodiment of a vehicle roof according to the invention will now be described with reference to respective drawings, wherein:

FIG. 1 is a top view of a vehicle sliding roof according to the invention;

FIG. 2a is a section of the same vehicle sliding roof along lines II—II in FIG. 1;

FIG. 2b is a section of the same vehicle sliding roof in a different opening position;

FIG. 2c is a section of the same vehicle sliding roof in a closed position;

FIG. 2d is a view similar to that of FIG. 2b but showing a spindle having a continuously variable thread pitch;

FIG. 3 is a section of the same vehicle sliding roof along lines III—III in FIG. 1 pivoted 90 degrees;

FIGS. 4a and b show another embodiment of the height-adjusting device in two positions; and FIG. 5 shows yet another embodiment of the height-adjusting device.

In a vehicle sliding roof of FIG. 1, a roof opening 1 of a vehicle roof 2 is enclosed by a plastic frame 3. One-piece spindles 4 made of metal or plastic material extends within the frame in the lengthwise direction (A) of the vehicle. The spindles 4 are supported for rotation in bearings 5, 6 and 7 but do not move axially. At the front side of the roof opening, the spindles 4 have at their ends, bevel gear wheels 8, which mesh with bevel gear wheels 9 of drive shafts 11 supported in the front portion of the frame in bearings 10. The drive shafts 11 are connected in the middle of the frame to a crank drive 12, known per se.

As appears from FIG. 2a, plate 13, closing the roof opening 1, has near its front edge 14 a horizontal transverse axle 15 or a similar support element pivotally supported on a front support 16. A height-adjusting device 20 provides for adjusting the height of the rear end of the plate 13. The height-adjusting device includes a support element 17 fastened to the plate 13 at a permanent distance from the transverse axle 15 and connected with a lever 19 to a rear support 18. The spindle 4 actuates the height-adjusting device. FIGS. 4a, 4b and 5 show other embodiments (21, 22) of height-adjusting device. All these height-adjusting devices can be used also in connection with the front support 16. It is also possible to design the stand of bearing 6 also as a single collar integrally formed with the spindle 4 which can serve as a stop for the front support 16 (FIG. 2a) or the rear support 18 (FIG. 2c). Obviously, the hinge points of the plate 13 on the front and rear supports may also be displaced to the side on the spindle 4 or similar actuating means such as a cable traction that may be used.

The front and rear supports comprises threaded sockets located within suitable openings of the front and rear supports whereby upon rotation of the spindle 4, the front and rear supports are moved in the lengthwise direction A of the vehicle. The spindle pitch in the zone B, along which the front support 16 is moved back and forth, in the example shown in the figures is twice of that in the zone C, along which the rear support is moved back and forth.

Due to these different pitches, upon rotation of the spindle, the front and rear supports move at different speeds thus changing their relative positions lengthwise of the vehicle. Because the speed of movement of the support element 17 attached to the plate 13 support 18 is faster than the speed of movement of the rear support 18, the lever 19 pivots relative the support 18. This effects a change in the height of the rear end of the plate 13 relative to the vehicle roof as shown in FIGS. 2a-2b. Therefore, slide tracks and similar noise-generating parts are not needed. The hinge points may also be formed integral with the plate 13. Likewise, a very wide opening of the roof is possible without impairing the stability of the opened roof.

According to FIGS. 4 and 4b, a height-adjusting device may also have corresponding sloping slide surfaces 24 and 25 which may form a dovetail joint or the like so that at sliding movement, a secure support is provided for the plate 13. Here, the sliding surface 25 is arranged on a support 26 movable along the spindle 4 and the sliding surface 24 is on a support element 27 which can pivot with the plate 13. Here also, the relative position of the support 26 and the support element 27 with respect to the lengthwise direction of the vehicle spindle 4 and simultaneous height-adjustment of both elements takes place.

As shown in FIG. 5, by inclining the corresponding sliding surfaces in the opposite direction, it can also be attained that, with a backward movement of a support 28 upon rotation of the spindle 4, the plate 13 is lowered and pushed under the vehicle roof when the front support moves.

What is claimed is:

1. A sliding roof for a vehicle comprising:
    a plate having a closed position in which it closes an opening in the vehicle roof and being movable lengthwise of the vehicle to a plurality of positions for varying the amount of opening in the vehicle roof;
    front support means for supporting the front end of said plate, said front support means being movable lengthwise of the vehicle to move said plate to said plurality of different positions, said front support means including a horizontal transverse axle connected with the front end of said plate for joint movement therewith;
    rear support means for supporting the rear end of said plate, said rear support means comprising a support member connected to the rear end of said plate at a predetermined distance from said horizontal transverse axle for joint movement with said plate and a rear support movable lengthwise of the vehicle relative to said support member to adjust the height of the rear end of said plate to thereby vary the amount of opening at said plurality of positions of said plate; and
    actuator means for moving said front support means and said rear support in predetermined relative relationship to thereby provide for movement of said rear support relative to said support member, said actuator means comprising threaded spindle means extending lengthwise of the vehicle, said front support means and said rear support comprising socket means having internal threads for receiving said threaded spindle means therein, thread pitches of said threaded spindle means in a zone of movement of said front support means and in a zone of movement of said rear support being relatively different.

2. A sliding roof for a vehicle as set forth in claim 1 wherein the thread pitch of said spindle is continuously variable.

3. A sliding roof for a vehicle as set forth in claim 1 further including drive means for actuating the spindle means, said drive means comprising shaft means and bevel gear transmission means.

4. A sliding roof for a vehicle as set forth in claim 3 wherein said spindle means includes two spindles arranged on opposite sides of said roof opening, said shaft means comprising two shafts, said bevel gear transmission means comprising two pairs of bevel gears, and said drive means further comprising a crank for actuating said two shafts.

5. A sliding roof for a vehicle as set forth in claim 1, 2 or 4 further including bearing means for supporting said threaded spindle means for rotation.

6. A sliding roof for a vehicle, as set forth in claims 1, 2, or 4 wherein said threaded spindle means is made of plastic material.

7. A sliding roof for a vehicle as set forth in claims 1, 2 and 4 wherein said rear support means includes a lever pivotal relative to said support member and said rear support means.

8. A sliding roof for a vehicle as set forth in claim 1, 2 and 4 wherein said rear support means comprises correspondingly inclined surfaces on said support member and said rear support.

* * * * *